US007856016B2

(12) United States Patent
Shinomiya et al.

(10) Patent No.: US 7,856,016 B2
(45) Date of Patent: Dec. 21, 2010

(54) ACCESS CONTROL METHOD, ACCESS CONTROL SYSTEM, AND PACKET COMMUNICATION APPARATUS

(75) Inventors: Daisuke Shinomiya, Kawasaki (JP); Hidekazu Baba, Kawasaki (JP); Yasuharu Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 208 days.

(21) Appl. No.: 11/836,992

(22) Filed: Aug. 10, 2007

(65) Prior Publication Data
US 2007/0283014 A1 Dec. 6, 2007

Related U.S. Application Data

(63) Continuation of application No. PCT/JP2005/004359, filed on Mar. 11, 2005.

(51) Int. Cl.
H04L 12/28 (2006.01)
H04L 29/06 (2006.01)
G06F 15/173 (2006.01)
G06F 7/04 (2006.01)
G06F 9/00 (2006.01)
G11C 7/00 (2006.01)

(52) U.S. Cl. ................ 370/389; 709/225; 713/155; 726/4; 726/5; 726/13; 726/21; 726/27

(58) Field of Classification Search ............... None
See application file for complete search history.

(56) References Cited

U.S. PATENT DOCUMENTS 6,944,183 B1* 9/2005 Iyer et al. ............... 370/466
7,069,580 B1* 6/2006 Deitz et al. ............. 726/2
7,100,207 B1* 8/2006 Prager .................. 726/27
7,310,812 B2* 12/2007 Kato et al. .............. 726/2
7,388,866 B2* 6/2008 Fan et al. ............... 370/392
2004/0177247 A1* 9/2004 Peles .................... 713/155

FOREIGN PATENT DOCUMENTS

| CN | 1380772 | 11/2002 |
| JP | 62-072246 A | 4/1987 |
| JP | 07-087122 | 3/1995 |
| JP | 2003-283549 | 10/2003 |

(Continued)

OTHER PUBLICATIONS

English translation of the the japanese publication 2003-283549 A, Tatsunori Koike, Router-type inter-network connecting device, Mar. 31, 1995.*

(Continued)

Primary Examiner—Pankaj Kumar
Assistant Examiner—Hicham B Foud
(74) Attorney, Agent, or Firm—Fujitsu Patent Center

(57) ABSTRACT

An access control method for a network including a plurality of packet communication apparatuses is disclosed. The access control method includes a first step in which a sender packet communication apparatus attaches user attribute information to a packet to be transmitted, and a second step in which a communication control mechanism within an end system corresponding to a destination packet communication apparatus or a packet receiving apparatus performs access control based on the user attribute information attached to the packet.

10 Claims, 10 Drawing Sheets

FOREIGN PATENT DOCUMENTS

| JP | 2004-015530 | 1/2004 |
| JP | 2004-062417 | 2/2004 |

OTHER PUBLICATIONS

English translation of the the japanese publication 07-087122 A, Kazuhiko et al, Contents filtering apparatus and method, Mar. 10, 2003.*

Chinese First Office Action dated Jan. 9, 2009, from the corresponding Chinese Application.

International Searched Report, dated Jun. 7, 2005, corresponding to International Application No. PCT/JP2005/004359.

Japan Patent Office; English Language Summary of Office Action mailed Jul. 6, 2010 and issued with respect to correspondent JP Patent Application No. 2007-506969.

* cited by examiner

FIG.4

| TERMINAL IDENTIFIER | USER ATTRIBUTE VALUE |
|---|---|
| 01-23-45-67-89-AB (MAC ADDRESS) | 3 |

FIG.6

| APPLICATION IDENTIFIER | USER ATTRIBUTE VALUE | ACTION |
|---|---|---|
| 1 (WEB ACCESS [http]) | $2 \leq$ (ATTRIBUTE IS 2 OR HIGHER) | PASS |
| not 1 (OTHER THAN WEB ACCESS) | $4 \leq$ (ATTRIBUTE IS 4 OR HIGHER) | PASS |
| NOT SATISFYING ABOVE CONDITIONS | | DISCARD |

ACCESS CONTROL METHOD, ACCESS CONTROL SYSTEM, AND PACKET COMMUNICATION APPARATUS

CROSS REFERENCE TO RELATED APPLICATIONS

This application is a U.S. continuation application filed under 35 USC 111(a) claiming benefit under 35 USC 120 and 365(c) of PCT application JP2005/004359, filed Mar. 11, 2005, the entire contents of which are hereby incorporated by reference.

BACKGROUND OF THE INVENTION

1. Field of the Invention

The present invention relates to an access control method for packet communication, an access control system using such a method, and a packet communication apparatus.

2. Description of the Related Art

In view of the recent developments of the functions and performance of computers including personal computers and network apparatuses including packet communication apparatuses as well as the overall decrease in their prices, computer networks (simply referred to as 'network' hereinafter) employing such computers and network apparatuses are becoming increasingly popular.

In corporations, the role of a network as a tool for smoothly conducting business operations is becoming increasingly important, and oftentimes, valuable data are exchanged over a network. Accordingly, corporations implement security measures such as firewalls to protect data from unauthorized access or virus attacks, for example.

Also, security measures for a network include the following. For example, with respect to the OSI Reference Model Layer 2 (Data Link Layer), MAC address filtering or Virtual LAN (VLAN) path control may be implemented. With respect to the OSI Reference Model Layer 3 (Network Layer), IP address filtering settings may be set up in a packet communication apparatus to limit access by a user (computer) only to authorized areas, for example. The following Patent Documents 1 and 2 disclose exemplary techniques related to access control through filter setting.

Patent Document 1: Japanese Laid-Open Patent Publication No. 2004-62417

Patent Document 2: Japanese Laid-Open Patent Publication No. 2004-15530

Access control techniques involving filter setting of a packet communication apparatus according to the prior art have the following problems. FIG. 1 is a diagram showing an exemplary configuration of a network. Access control is realized in the illustrated network of FIG. 1 by setting filters in packet communication apparatuses 1-4.

For example, in the case of authorizing communication between a computer operated by a user (referred to as PC hereinafter) 5 and an application server 6 while limiting communication between other computers and the application server 6, filter settings have to be implemented in the packet communication apparatus 2 of the network of FIG. 1

If access is to be controlled at the IP level, rules for authorizing communication between the PC 5 and the application server 6 and rules for limiting communication between other PCs and the application server 6 are set up as IP address filter settings in the packet communication apparatus 2 of the network of FIG. 1 to realize access control.

According to such filter setting technique, provided that the number of users (PCs) making access to servers is denoted as 'm' and the number of servers to be accessed is denoted as 'n', a total of m×n rules have to be set up in an environment where users (PCs) having specific access rights cannot be consolidated. It is noted that an environment where users having specific access rights cannot be consolidated may refer to a case where users hold differing network addresses, for example.

In practice, since the filter settings are merely rules specifying whether to pass or block a packet, the total number of rules may be reduced to m×n/2. However, when the number of rules is reduced in this manner, it may be difficult to determine whether the non-existence of a rule constitutes a rule or a setting blunder. In the illustrated example, it is assumed that all rules related to communications between PCs 5, 7, 8 and application servers 6, 9 are set in the packet communication apparatuses 1-4.

It is noted that the number or rules set in the packet communication apparatuses 1-4 may be reduced by only setting rules related to the PCs that the respective packet communication apparatuses 1-4 are actually managing within the network. However, in this case, when PC 8 moves to the location of PC 7 as a result of a user moving to another office location with his/her PC, for example, rules relating to the PC 8 that are set in packet communication apparatus 3 have to be set in packet communication apparatus 4. Therefore, the work load of a network manager may be increased in a case where a user frequently moves around with his/her PC, for example.

Also, when an application server 9 is added to the network, for example, a rule related to the application server 9 has to be set in each of the packet apparatuses 1-4. That is, even when only one application server is added to the network, if a total number of 'i' packet communication apparatuses exist within the network, the new rule has to be set in each of the 'i' number of packet communication apparatuses.

As can be appreciated, the above-described filter setting access control schemes according to the prior art have various problems such as the fact that a large number of m×n rules have to be set in the packet communication apparatuses 1-4, rules have to be reset in the packet communication apparatuses 1-4 when a PC such as PC 8 moves to a new location, and rules have to be added to each of the packet communication apparatuses 1-4 when a server such as the application server 9 is added to the network.

The above problems may be attributed to the fact that filter setting access control schemes according to the prior art depend on the network configuration. In consideration of the recent proliferation of the wireless LAN, user mobility has to be taken into account which may be create a large burden on network manager of filter setting access control schemes according to the prior art.

SUMMARY OF THE INVENTION

The embodiments of the present invention are directed to providing an access control method, an access control system, and a packet communication apparatus that are capable of solving one or more of the above problems of the prior art.

According to one embodiment of the present invention, an access control method for a network including a plurality of packet communication apparatuses is provided, the method including:

a first step in which a sender packet communication apparatus attaches user attribute information to a packet to be transmitted; and a second step in which a communication control mechanism within an end system corresponding to a destination packet communication apparatus or a packet receiving apparatus performs access control based on the user attribute information attached to the packet.

In one preferred embodiment, the second step may involve performing access control based on policy information that is set beforehand and the user attribute information.

In another preferred embodiment, the second step may involve deleting the user attribute information attached to the packet.

In another preferred embodiment, the first step may involve attaching application information of the packet and the user attribute information to the packet to be transmitted; and the second step may involve performing access control based on a combination of the user attribute information attached to the packet and the application information of the packet.

In another preferred embodiment, when user attribute information is attached to the packet to be transmitted beforehand, the first step may involve deleting the user attribute information that is attached beforehand and attaching new user attribute information to the packet to be transmitted.

In another preferred embodiment, the first step may involve attaching the user attribute information when the packet to be transmitted is determined to be a packet to which user attribute information has to be attached; and the second step may involve performing access control based on the user attribute information attached to the packet when the packet received is determined to be a packet to which user attribute information has to be attached.

According to another embodiment of the present invention, an access control system including a plurality of packet communication apparatuses is provided, the system including:

a sender packet communication apparatus that attaches user attribute information to a packet to be transmitted; and a destination packet communication apparatus that performs access control based on the user attribute information attached to the packet.

According to another embodiment of the present invention, a packet communication apparatus is provided that includes:

attribute information attaching means for attaching user attribute information to a packet received from an end system; and access control means for performing access control based on user attribute information attached to a packet addressed to the end system.

According to one aspect of the present invention, user attribute information that does not depend on a network configuration (network topology) is used in access control so that changes and additions to be made on filter settings due to changes and additions made on a network configuration may be substantially simplified. According to another aspect of the present invention, by using user attribute information that does not depend on a network configuration in access control, a person without network expertise may be able to perform filter setting.

BRIEF DESCRIPTION OF THE DRAWINGS

FIG. 4 is a diagram showing an exemplary table containing user attribute value that is stored in a packet communication apparatus;

FIG. 6 is a diagram showing an exemplary table representing a security policy;

DESCRIPTION OF THE PREFERRED EMBODIMENTS

In the following, principles of the present invention are described for facilitating understanding of the present invention. According to an embodiment of the present invention, a tag is generated based on user attribute information (e.g., information on the department to which a user belongs, or his/her position) that is not dependent on a network configuration, and access control is performed using this tag. It is noted that the tag may also be generated based on user attribute information and application information of a packet, for example. The above tag is referred to as a security tag hereinafter, and in the following descriptions, it is assumed that a security tag that is generated based on user attribute information and application information of a packet is used.

Figure 1:
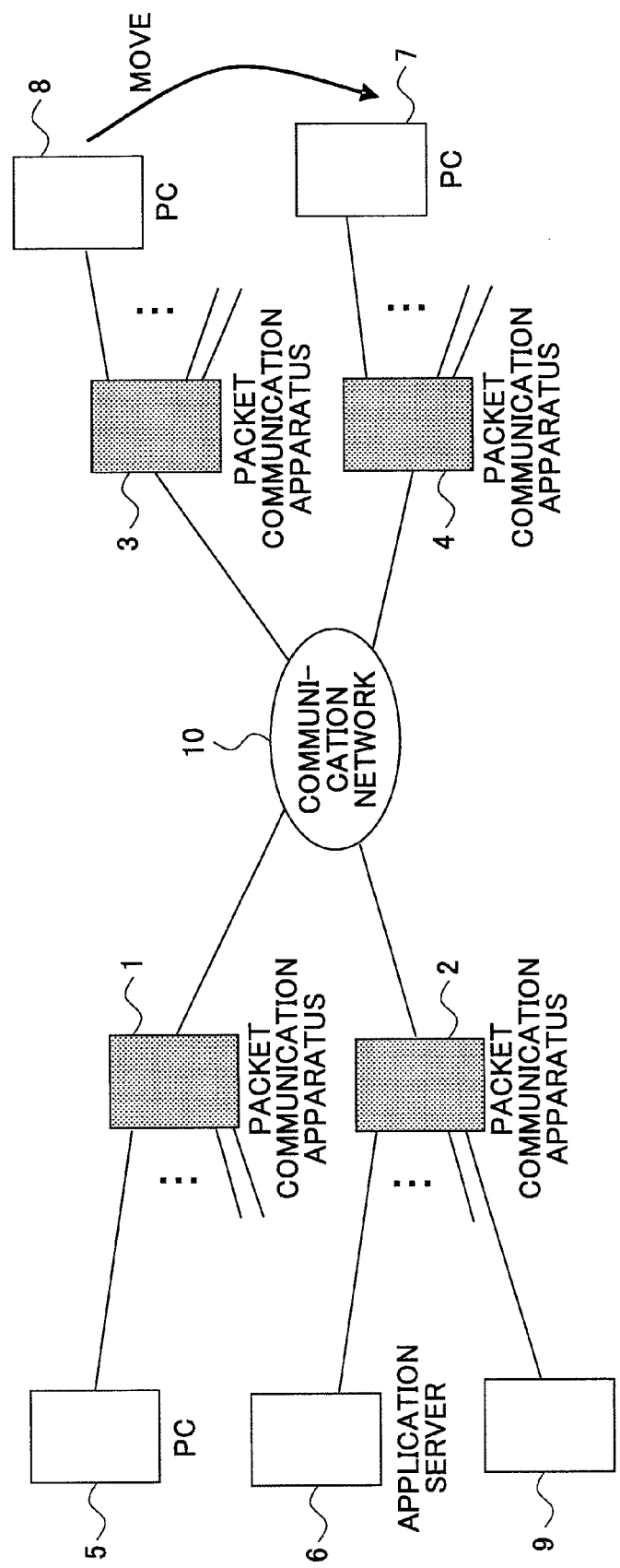
FIG. 1 is a diagram showing an exemplary configuration of a network.

For example, in FIG. 1, communication may be established from the PC 5 to the application server 6 by the following processes. The inlet side (sender) packet communication apparatus 1 identifies application information of a packet received from the PC 5, attaches a security tag to the packet which security tag is generated based on the application information and attribute information of the user operating the PC 5, and transmits the resulting packet.

The outlet side (destination) packet communication apparatus 2 compares pre-set policy information and the security tag attached to the packet received from the packet communication apparatus 1 and determines whether access may be allowed based on the comparison result as is described below. If it is determined that access is allowed, the packet communication apparatus 2 passes the packet. That is, the packet communication apparatus 2 transmits the packet to the application server 6. If it is determined that access is not allowed, the packet communication apparatus 2 discards the packet.

In an access control scheme through filter setting of a packet communication apparatus according to an embodiment of the present invention, the number of settings may be reduced compared to an access control scheme through filter setting of a packet communication apparatus according to the prior art. For example, in the access control scheme through filter setting of a packet communication apparatus according to the prior art as described above, the number of settings has been m×n. On the other hand, in the access control scheme through filter setting of a packet communication apparatus according to an embodiment of the present invention, the number of settings may be reduced to m+n at the maximum. That is, access control through filter setting of a packet communication apparatus according to an embodiment of the present invention may be realized by setting m sets of attribute information for the m number of users and n sets of policy information for the n number of packet communication apparatuses.

For example, in a corporate network of a corporation with 10,000 employees and 1,000 packet communication apparatuses, 10,000,000 versions of setting information at the maximum may have to be set according to the access control scheme through filter setting of a packet communication apparatus according to the prior art. On the other hand, in access control through filter setting of a packet communication apparatus according to an embodiment of the present invention only 11,000 versions of setting information at the maximum may be needed.

It is noted that when measures are taken to use the application information as described above in access control through filter setting according to the prior art, the number of setting may be increased even further.

Attribute information of a user is not dependent on the network configuration since it is set in an authentication server as is described below. Therefore, access control through filter setting of a packet communication apparatus according to an embodiment of the present invention enables flexible adaptation to alterations and additions implemented on the network configuration, and filter settings may not have to be reset even when a user is to access a server from a different office location, for example.

Embodiment 1

Figure 2:
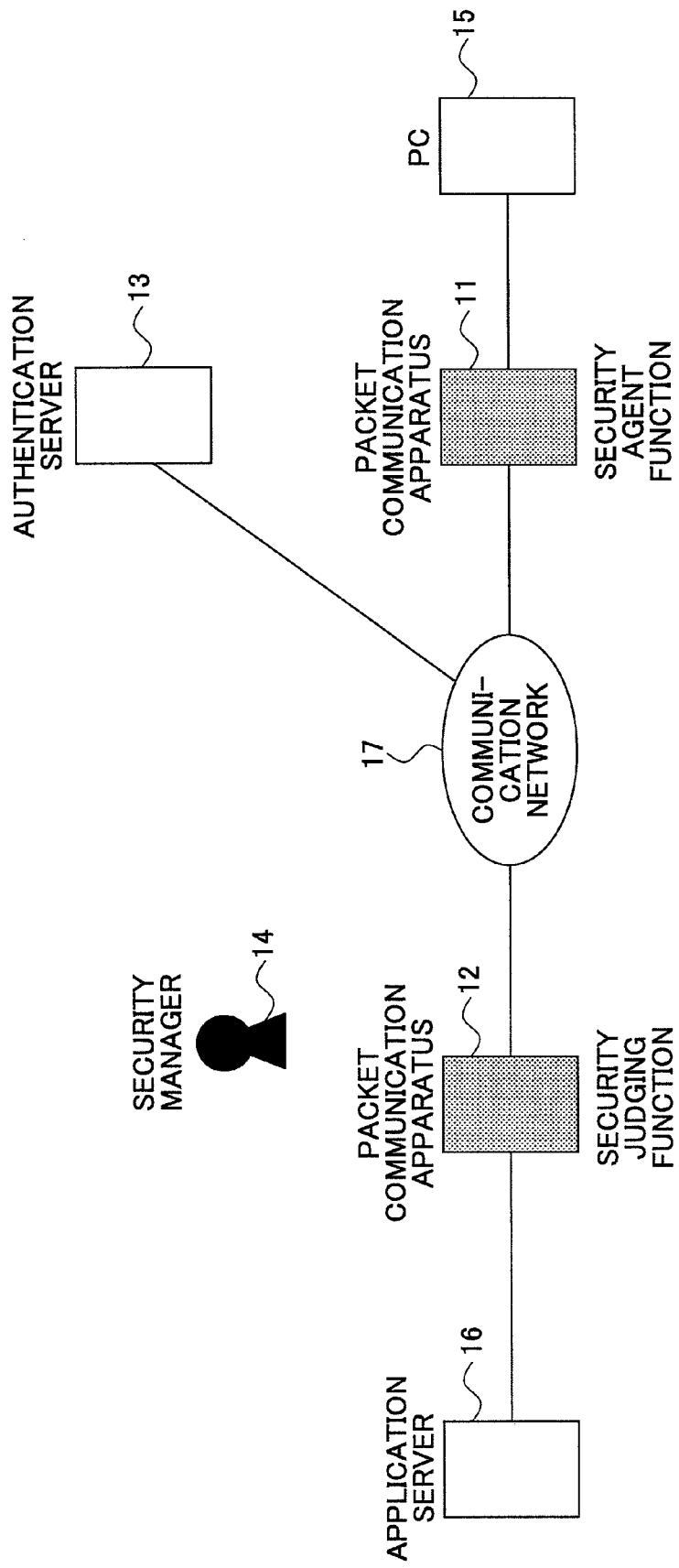
FIG. 2 is a diagram showing an exemplary configuration of an access control system according to an embodiment of the present invention.

FIG. 2 is a diagram illustrating a configuration of an access control system according to an embodiment of the present invention. The illustrated access control system of FIG. 2 includes packet communication apparatuses 11, 12, an authentication server 13, a PC 15, an application server 16, and a communications network 17. The packet communication apparatuses 11, 12, and the authentication server 13 are connected to the communications network 17. The PC 15 is connected to the communications network 17 via the packet communication apparatus 11, and the application server 16 is connected to the communications network 17 via the packet communication apparatus 12.

The packet communication apparatus 11 may be an access switch or a hub that has a security agent function, for example, as is described in detail below. The packet communication apparatus 12 may be an access switch or a load sharing device that has a security judging function, for example, as is described in detail below. Also, the packet communication apparatuses 11 and 12 are connected to an end system such as the PC 15 or the application server 16.

The authentication server 13 stores authentication information pertaining to users using the access control system of the present embodiment (e.g., list of user IDs or passwords) and attribute information of the users. The authentication server 13 may provide an authentication result or attribute information of a user in response to a request from the packet communication apparatus 11. The authentication server 13 may be a RADIUS (Remote Authentication Dial In User Service) server, for example.

The security manager 14 sets a security policy for each server such as the application server 16 as policy information. A security policy may be a combination of application information and attribute information of a user that is allowed access to the server. The security manager 14 is in charge of setting authentication information and attribute information for each user.

The application server 16 is an example of a server. The PC 15 is an example of an apparatus such as a computer that is operated by a user. The communications network 17 may be an IP-based network (e.g., intranet) that is configured by interconnecting routers, for example. A user may use the PC 15 to perform predetermined application communication operations with respect to the application server.

Figure 3:
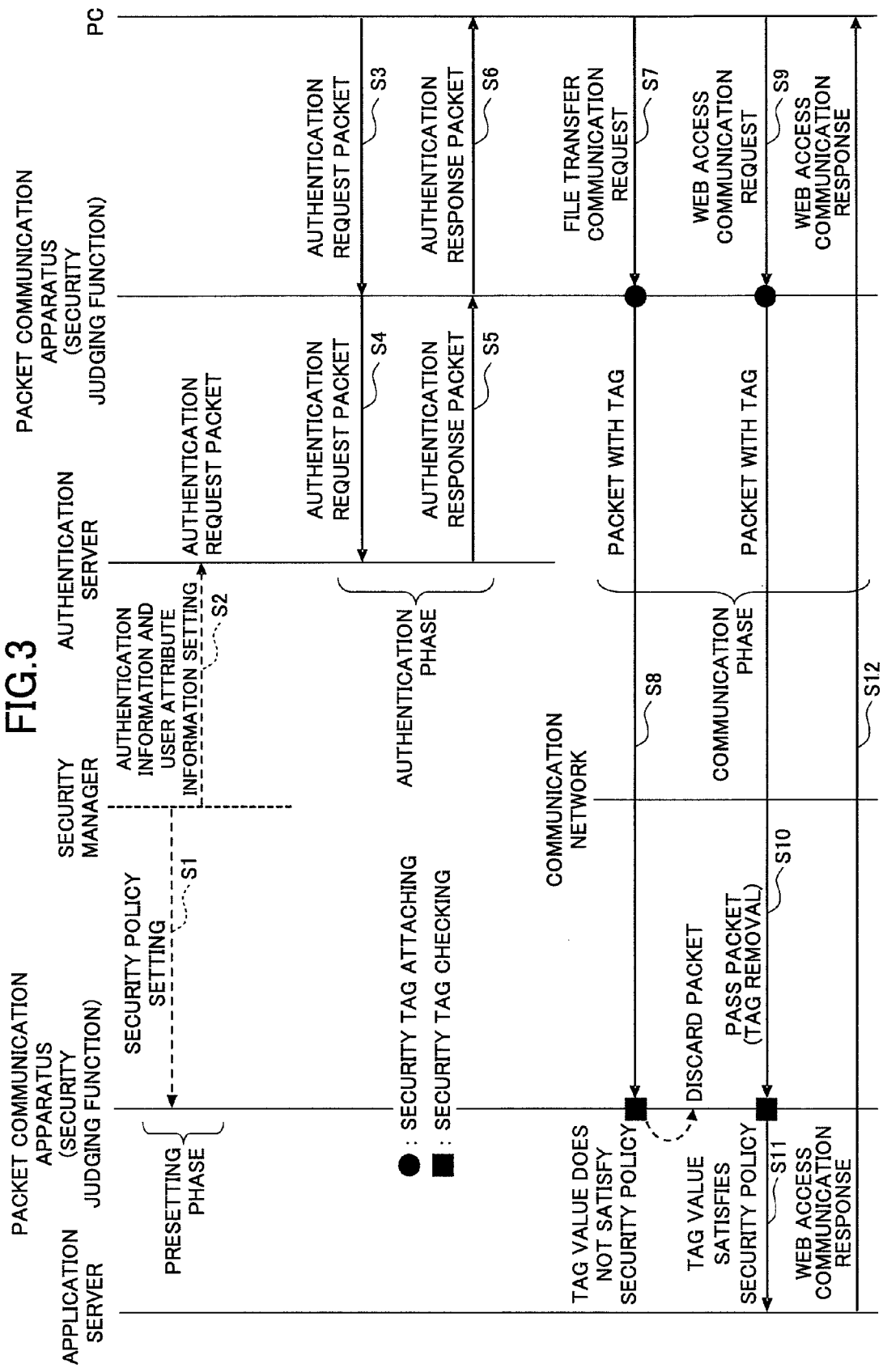
FIG. 3 is a sequence chart illustrating overall operations of the access control system according the present embodiment.

FIG. 3 is a sequence chart illustrating overall operations of the access control system according to an embodiment of the present invention. In step S1, the security manager 14 sets a security policy for the packet communication apparatus 12. For example, the security manager 14 may set a security policy as follows: "Pass web access packet if user attribute information value (simply referred to as 'attribute value' hereinafter) is greater than or equal to 2. Pass other application packet if user attribute value is greater than or equal to 4. Discard other packets."

In the present example, it is assumed that a security clearance ranging from 1-5 is assigned to each user according to the position and responsibilities of the user. For example, the security clearance may be assigned to a user according to the following: "executive class: 5, top manager class: 4, middle manager class: 3, regular employee class: 2, part-time employee and visitor class: 1". It is noted that the access control system according to the present embodiment is not concerned with the actual definitions assigned to the user attribute values. In other words, the security manager 14 does not have to disclose the definitions of the attribute values and may freely define the user attribute values.

In another example, the security clearance may be assigned according to the department to which a user belongs as follows: "Sales: 1, SE: 2, Development: 3, Human Resources: 4, Accounting: 5". In the case where the security clearance is assigned according to the department to which a user belongs as described above in the access control system according to the present embodiment, settings are possible in which a user belonging to the SE department or the Development department is authorized to access a web server while a user belonging to the Sales department is not authorized to access the web server, for example. As can be appreciated, user attribute values may be flexibly set according to the desired security policies of corporations.

In step S2, the security manager 14 sets user authentication information (e.g., user ID, password) and user attribute information in the authentication server 13. For example, the security manager 14 may set user ID '123456578' and password 'abcdefgh' as user authentication information and user attribute value '3' in the authentication server 13. It is noted that steps S1 and S2 constitute a pre-setting phase.

According to the sequence chart of FIG. 3, after the pre-setting phase, a user may connect the PC 15 to the packet communication apparatus 11 to start an authentication phase. It is noted that various methods may be implemented for performing authentication processes of the authentication phase. In the present example, authentication processes are performed using a user ID and password.

In step S3, the PC 15 transmits an authentication request packet containing a user ID and a password of its user to the packet communication apparatus 11. Then, in step S4, the packet communication apparatus 11 forwards the authentication request received from the PC 15 to the authentication server 13. The authentication server 13 performs authentication processes using the user ID and password contained in the authentication request packet.

In step S5, when the authentication server 13 determines that the user ID and password correspond, it transmits an authentication response packet containing an authentication OK response and a user attribute value to the packet communication apparatus 11. For example, the authentication server 13 may transmit the authentication OK response and an attribute value of '3' to the packet communication apparatus 11. In the case where the authentication server 13 determines that the user ID and password do not correspond, it transmits an authentication response packet containing an authentication NG response to the packet communication apparatus 11.

Then, in step S6, the packet communication apparatus 11 temporarily stores the user attribute value and transmits the authentication OK response to the PC 15. The packet communication apparatus 11 may retain the user attribute value while the authentication OK response is valid. When a new authentication request is issued from the same user, the retained user attribute value may be overwritten.

FIG. 4 shows an exemplary table containing user attribute value that is stored in a packet communication apparatus. In the illustrated table of FIG. 4, a user attribute value is stored in association with an identifier (e.g., MAC address) of the terminal (PC 15) operated by the authenticated user.

It is noted that the process steps S3-S6 constitute the authentication phase. However, changes may be made to the authentication processes as long as the correspondence between an authenticated user and the user attribute value assigned to this user may be stored in the packet communication apparatus 11 when a positive authentication result is obtained in the authentication phase.

According to the sequence chart of FIG. 3, a communication phase may be started after the authentication phase. In the communication phase, for example, a TCP Syn packet may be transmitted from the PC 15 to the application server 16 as the destination, and when a response is received at the PC 15, the communication operations are continued. On the other hand, when the PC 15 does not receive a response from the application server, the communication operations are aborted.

Upon relaying a packet, the packet communication apparatus 11 attaches a security tag to the packet according to the present embodiment. In the present example, the security tag is set in an option field of an IP header. The security tag may include an application identifier as application information of the packet and a user attribute value as user attribute information.

Figure 5:
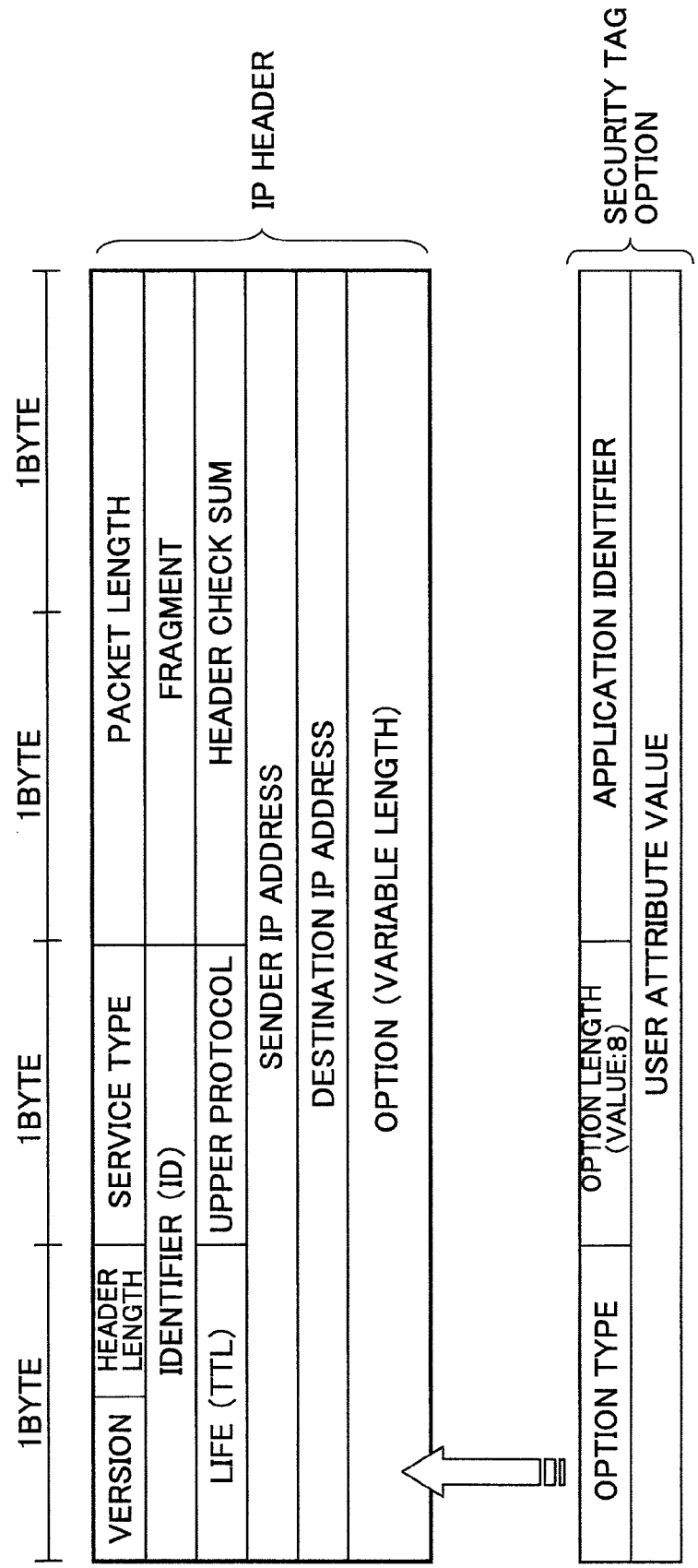
FIG. 5 is a diagram showing an exemplary format of a security tag.

FIG. 5 is a diagram illustrating an exemplary format of the security tag. The security tag illustrated in FIG. 5 contains an application identifier and a user attribute value and is includes in the option field of an IP header.

The packet communication apparatus 11 may determine the application identifier by examining the packet. For example, the packet communication apparatus 11 may examine the packet header information referred to as TCP port number to determine the application of the packet (e.g., mail, web access, file transfer, IP phone, etc.). It is noted that although the TCP port number is used to determine the application of the packet in the present example, other methods may be used as well. Also, the user attribute value that is temporarily stored in the table illustrated in FIG. 4 during the authentication phase may be used as the user attribute value of the security tag.

Since the security tag is set in the option field of an IP header in the present example, the packet having a security tag attached thereto by the packet communication apparatus 11 may pass the communication network 17 without any problem to reach the packet communication apparatus 12. In turn, the packet communication apparatus 12 may check the security tag of the packet.

In the sequence chart of FIG. 3, steps S7 and S8 illustrate an exemplary case in which the application of the packet corresponds to file transfer, and steps S9-S12 illustrate an exemplary case in which the application of the packet corresponds to web access.

In the following, the case in which the application corresponds to file transfer is described. In step S7, the packet communication apparatus 11 receives a file transfer communication request packet from the PC 15, and attaches a security tag containing an application identifier representing file transfer and a user attribute value '3' to the received packet.

Then, in step S8, the packet communication apparatus 11 transmits the packet with the security tag attached thereto to the packet communication apparatus 12. The packet communication apparatus 12 compares the information included in the security tag attached to the received packet with a security policy represented by the table shown in FIG. 6 that is set beforehand in the pre-setting phase.

FIG. 6 is a table illustrating an exemplary security policy. The illustrated security policy of FIG. 6 represents the following information: "Pass web access packet if user attribute value is greater than or equal to 2. Pass other application packet if user attribute value is greater than or equal to 4. Discard other packets."

The packet communication apparatus 12 may determine based on the information contained in the security tag attached to the received packet that the application of the received packet corresponds to an application other than web access (file transfer) and the user attribute value is '3'. According to the security policy of FIG. 6, since the user attribute value has to be greater than or equal to 4 to allow access in the case where the packet application corresponds to an application other than web access, the packet communication apparatus 12 discards the received packet in the present case.

Since the packet communication apparatus 12 discards the file transfer packet, the packet cannot reach the application server 16. It is noted that the communication phase of steps S7 and S8 will produce the same results no matter how many times the process steps are retried. Also, the PC 15 has no means for rewriting the security tag. Therefore, there is no way of gaining successful access to the application server 16 through file transfer in the present example.

In order to successfully gain access to the application server 16 through file transfer, the user of the PC 15 (with an attribute value of '3') has to have a higher user attribute value (e.g., '4') assigned by the security manager 14 in accordance with a change in rank/position (e.g., through promotion to top manager) or a change in post/department (e.g., moving to human resources department), for example.

In the following, an example in which the packet application corresponds to web access is described. In step S9, the packet communication apparatus 11 receives a web access communication request packet from the PC 15, and attaches a security tag including an application identifier representing web access and a user attribute value '3' to the received packet.

Then, in step S10, the packet communication apparatus 11 transmits the packet with the security tag attached thereto to the packet communication apparatus 12. In turn, the packet communication apparatus 12 compares the information contained in the security tag attached to the received packet with the security policy represented by the table of FIG. 6 that is set beforehand in the pre-setting phase.

The packet communication apparatus 12 may determine based on the information contained in the security tag attached to the received packet that the application of the received packet corresponds to web access and the user attribute value is 3. According to the security policy of FIG. 6, since access may be allowed if the user attribute value is greater than or equal to 2 in the case where the packet application corresponds to web access, the packet communication apparatus 12 passes the received packet.

In this way, the packet communication apparatus 12 passes the web access communication packet so that the packet reaches the application server 16. Then, in step S12, the application server 16 transmits a web access communication response to the PC 15. Upon receiving the response from the application server 16, the PC 15 starts a data transfer phase.

As can be appreciated, in the access control system according to the present embodiment, even when a user having the same user attribute value attempts to access the same server, access authorization results may vary depending on the application of the communication packet.

Figure 7:
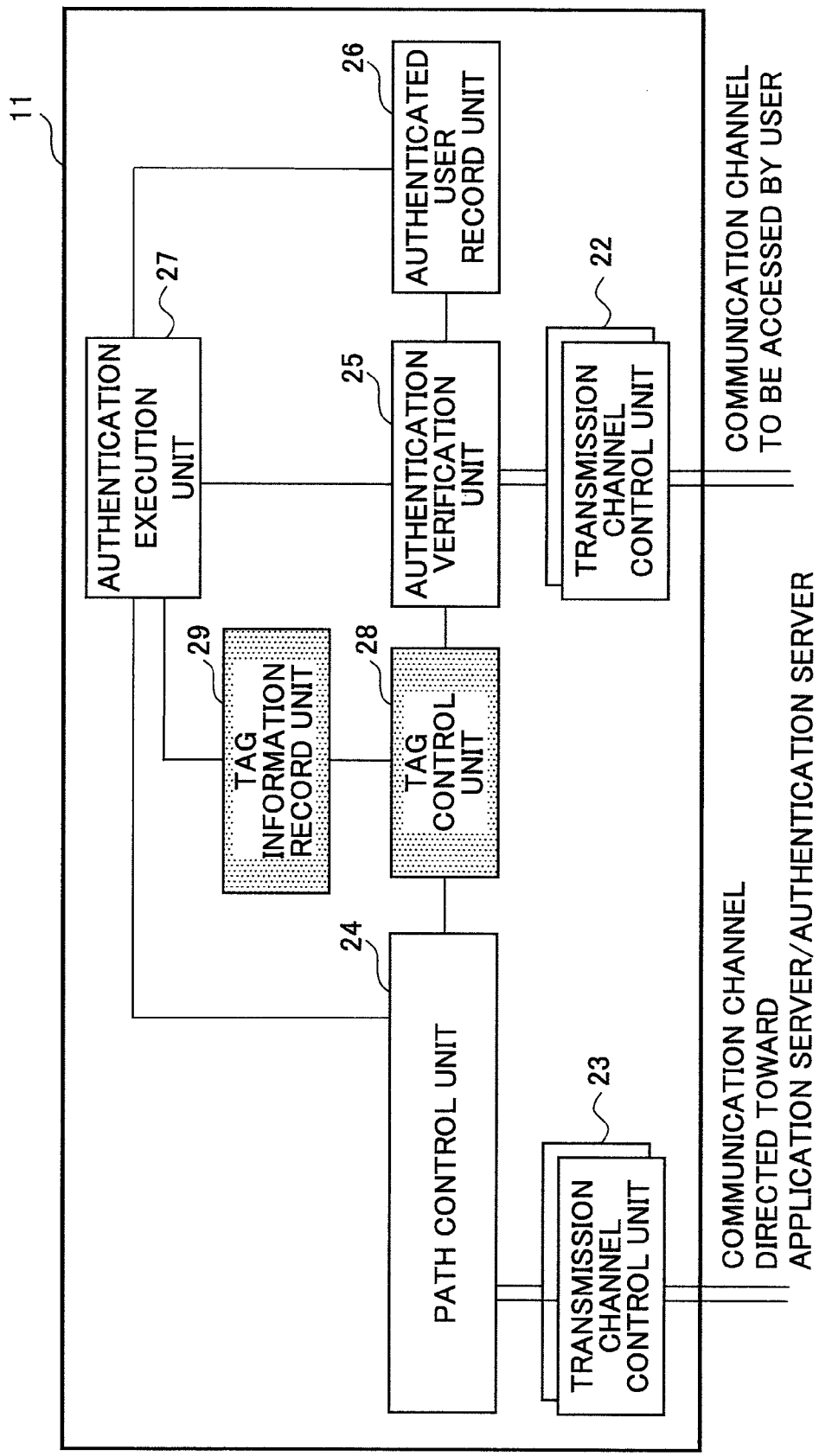
FIG. 7 is a block diagram showing an exemplary configuration of a packet communication apparatus having a security agent function.

FIG. 7 is a block diagram illustrating an exemplary configuration of a packet communication apparatus having a security agent function according to an embodiment of the present invention. In one example, the packet communication apparatus 11 may be an access switch that is connected to the PC 15. In FIG. 7, the packet communication apparatus 11 includes transmission channel control units 22, 23, a path control unit 24, an authentication verification unit 25, an authenticated user record unit 26, an authentication execution unit 27, a tag control unit 28, and a tag information record unit 29.

The transmission channel control unit 22 accommodates a communication channel to be accessed by the PC 15. The transmission channel control unit 22 performs physical/electrical channel accommodation and communication processes at the transmission control level. For example, the transmission channel control unit 22 may be a LAN port or a MAC control circuit of an access switch.

The transmission channel control unit 23 is used for establishing communication with the authentication server 13 and establishing communication with the application server 16 as the desired connection destination of the user. It is noted that the number of the transmission channel control units 22 and 23 provided within the packet communication apparatus 11 may correspond to the number of accommodated transmission channels. The path control unit 24 determines the route through which the packet is to be transmitted based on destination address information, selects the corresponding transmission channel control unit 23, and transmits the packet. The path control unit 24 may be a routing mechanism, for example. It is noted that the transmission channel control units 22, 23, and the path control unit 24 are functional blocks that realize a conventional access switch (Layer 3 switch having routing functions).

The authentication verification unit 25 determines the sender of a packet and determines whether the sender corresponds to an authenticated user. It is noted that a physical address such as a transmission channel identifier (identifier of the transmission channel control unit 22 that has received the packet) or a MAC address may be used as the packet sender identification information.

The authenticated user record unit 26 stores information for determining whether the sender corresponds to an authenticated user. The authenticated user record unit 26 stores a list of packet sender identification information of users that are authenticated (authentication OK). The authentication execution unit 27 executes authentication processes with the application server 13 as is described above.

The authentication verification unit 25, the authenticated user record unit 26, and the authentication execution unit 27 are functional blocks realizing a conventional authentication function. In the following, an exemplary access authentication technique according to the prior art is described.

For example, an unauthenticated user may transmit a packet from the PC 15 to the application server 16. In this case, the packet is received at the transmission channel control unit 22, and the transmission channel control unit 22 transmits the received packet to the authentication verification unit 25.

The authentication verification unit 25 refers to the list stored in the authenticated user record unit 26 using the packet sender identification information of the received packet as a key. However, since the current user is not authenticated, information on this user is not registered in the list and the authentication verification unit 25 discards the received packet in such a case. Thus, an unauthenticated user cannot access the application server 16.

The transmission channel control unit 22 performs different operations only when the received packet corresponds to an authentication request packet. When the authentication verification unit 25 receives an authentication request packet, it transmits the received packet to the authentication execution unit 27. For example, the authentication execution unit 27 may perform authentication procedures in the following manner.

First, the authentication execution unit 27 includes authentication information provided by the user (e.g., user ID and password) in an inquiry packet and transmits the inquiry packet to the authentication server 13. The inquiry packet is transmitted to the authentication server 13 via the path control unit 24 and the transmission channel control unit 23.

The authentication server 13 checks the user ID and password to verify the authenticity of the user. When authentication OK is indicated as the authentication result, the authentication server 13 transmits this authentication result and a user attribute value to the packet communication apparatus 11. As is described above, the user attribute value is assigned to each user by the security manager 14 and pre-set in the authentication server 13. It is noted that when authentication NG is indicated as the authentication result, the authentication server 13 merely transmits this authentication result to the packet communication server 11.

The authentication result and the user attribute value are transmitted to the authentication execution unit 27 via the transmission channel control unit 23 and the path control unit 24. When authentication OK is indicated as the authentication result, the authentication execution unit 27 associates the packet sender identification information provided by the user with the user attribute value and registers the associated information in a list stored in the tag information record unit 29.

Also, the authentication execution unit 27 registers the packet sender identification information of the user in the authenticated user record unit 26. Further, the authentication execution unit 27 sends the authentication result indicated as authentication OK to the user. The authentication result indicated as authentication OK is transmitted to the PC 15 via the authentication verification unit 25 and the transmission channel control unit 22. By performing the above processes, access authentication may be executed and completed.

It is noted that various other methods exist for executing access authentication and such other methods may equally be used in embodiments of the present invention. It is noted that in the access authentication process, the packet sender identification information of the user is registered in the authenticated user record unit 26 only when the authentication result is indicated as authentication OK.

The tag control unit 28 inserts the above-described security tag in a passing packet. Also, the tag control unit 28 determines the application (e.g., mail, web access, file transfer, IP phone) of the packet. The application of the packet may be determine in the manner described above, for example. In the present embodiment, the security tag is set in the option field of an IP header so that the operations of other functional blocks including the path control unit 24 are not influenced by the security tag. As is described above, the tag information record unit 29 stores a list of packet sender identification information of authenticated users associated with a corresponding attribute value.

After access authentication is completed, the user may transmit a packet from the PC 15 to the application server 16, for example. In this case, the packet is transmitted to the authentication verification unit 25 via the transmission channel control unit 22.

The authentication verification unit 25 refers to the list stored in the authenticated user record unit 26 using the packet sender identification information of the received packet as a key. Since information on the user is registered within the list in this case, the authentication verification unit 25 transmits the packet to the tag control unit 28. The tag control unit 28 searches the list stored in the tag information record unit 29 using the packet sender identification information of the received packet as a key.

Since packet sender identification information of the user is associated with a corresponding user attribute value and registered in the list of the tag information record unit 29 after access authentication is completed, the user attribute value may be found. Since the tag control unit is also configured to determine the application of the packet, it is capable of generating an application identifier.

The tag control unit 28 generates a security tag based on the user attribute value and the application identifier and transmits the packet having the generated security tag attached thereto to the path control unit 24. The path control unit 24 may perform ordinary route selection operations to transmit the packet via the transmission channel control unit 23.

It is noted that since the security tag is set in the option field of the IP header, it may not influence the operations of the path control unit 24 and the transmission channel control unit 23. Thus, the packet with the security tag attached thereto may be transmitted to the application server 16 without influencing the operations of the path control unit 24 and the transmission channel control unit 23.

It is noted that in the case where the tag control unit 28 receives a packet having a security tag attached thereto from the authentication verification unit 25, the tag control unit 28 deletes the security tag attached to the received packet. Then, the tag control unit 28 generates a new security tag in the manner described above and attaches the generated security tag to the packet.

By having the tag control unit 28 delete the security tag attached to the packet received from the authentication verification unit 25 and re-attaching a newly generated security tag to the packet, protection from security tag forgery may be ensured, for example.

As can be appreciated, in the packet communication apparatus 11 having a security agent function, a packet received from an unauthenticated user is discarded, and a security tag is attached to a packet received from an authenticated user in order to ensure that the security tag is not forged.

Figure 8:
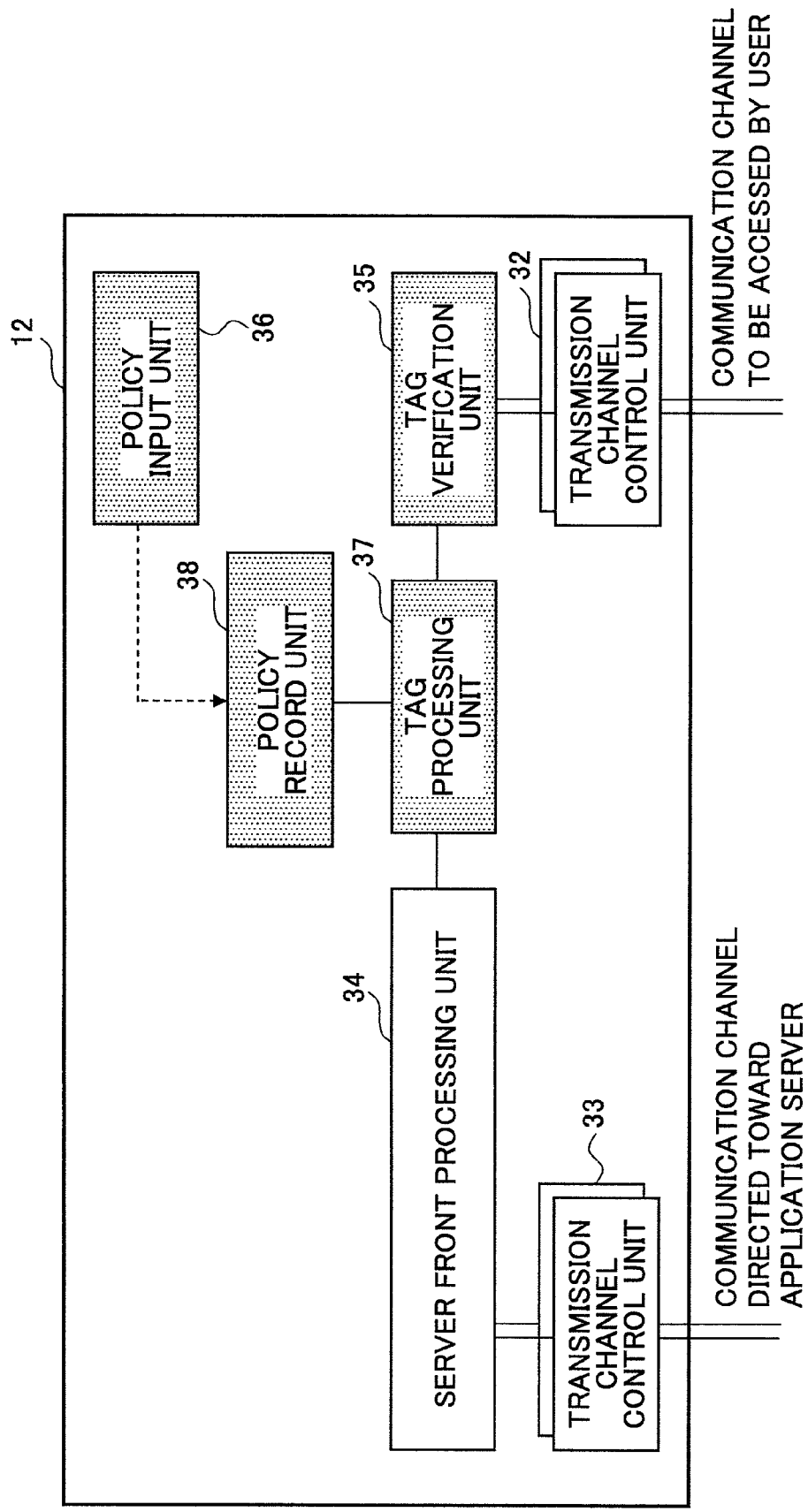
FIG. 8 is a block diagram showing an exemplary configuration of a packet communication apparatus having a security judging function.

FIG. 8 is a block diagram illustrating an exemplary configuration of a packet communication apparatus having a security judging function. For example, the packet communication apparatus 12 may be a switch that accommodates the application server 16 or a server load sharing device that accommodates plural application servers 16 and performs server load sharing.

The packet communication apparatus 12 includes transmission channel control apparatuses 32, 33, a server front processing unit 34, a tag verification unit 35, a policy input unit 36, a tag processing unit 37, and a policy record unit 38.

The transmission channel control unit 32 accommodates a communication channel to be remotely accessed by the PC 15 via the packet communication apparatus 11 having the security agent function and the communication network 17. The transmission channel control unit 32 physically/electrically accommodates a transmission channel and executes communication processes at the transmission channel control level. It is noted that the transmission channel control unit 32 may correspond to a LAN port or a MAC control circuit, for example.

The transmission channel control unit 33 may be similar to the transmission channel control unit 32 but is used to establish communication with the application server 16 that corresponds to the desired connection destination the user wishes to access. It is noted that the respective numbers of the transmission channel control units 32 and 33 provided within the packet communication apparatus 12 may correspond to the number of transmission channels to be accommodated. In one embodiment, the packet communication apparatus 12 may be embedded in the application server 16.

In the case where the packet communication apparatus 12 is embedded in the application server 16, the transmission channel control unit 33 may correspond to communication control software that may be executed to perform the functions of an internal bus connection interface or similar functions. The server front processing unit 34 realizes the main functions of the packet communication apparatus and may be configured to perform load sharing with respect to plural application servers, for example. It is noted that the transmission channel control units 32, 33, and the server front processing unit 34 correspond to main functional blocks of a conventional packet communication apparatus.

The tag verification unit 35 determines whether a security tag is attached to a packet. The policy input unit 36 sets a security policy in the policy record unit 38. It is noted that the security policy input unit 36 does not necessarily have to be included in the packet communication apparatus 12, and may alternatively be provided in the form of software that is run on an external general purpose PC (not shown), for example. Such an arrangement is possible because the policy input unit 36 does not necessarily have to maintain high speed and steady connection with the other functional blocks since it is operated during the pre-setting phase.

In the packet communication apparatus 12 of FIG. 8, connection between the policy input unit 36 and the policy record unit 38 is represented by a dotted line arrow to illustrate the policy input unit 36 as a unidirectional presetting functional block.

The tag processing unit 37 checks the security tag attached to a packet, compares the information included in the security tag with the security policy set in the policy record unit 38, and determines whether the packet may be passed. The policy record unit 38 stores a security policy corresponding to conditions that have to be satisfied by a security tag.

It is noted that the security input unit 36 that sets a security policy in the policy record unit 38 may provide an interface that may be easily understood by the security manager 14 such as a simple language describing the security policy. The security manager 14 may set policies designating which users with which attribute values may be allowed to access which servers, or a special terminal from an existing environment that may be allowed to access a server without a security tag, for example, using the interface provided by the policy input unit 36 so that the setting procedures may be simplified and referencing or updating of the set policies may be easily performed as is necessary or desired.

A special terminal from an existing environment that may be allowed to access a server without a security tag may be an implicitly secure terminal that is located in a physically protected environment, for example. It may be convenient to designate such a special terminal especially during transition from an existing environment, for example.

It is noted that since the policy record unit 38 is referenced by functional blocks such as the tag verification unit 35 and the tag processing unit 37, it may be arranged into a format that enables mechanical processing at a higher speed (e.g., mask pattern).

In the following, operations of the security judging function are described. In the example described below, it is assumed that pre-setting of a security policy in the policy record unit 38 by the policy input unit 36 has already been completed.

A packet transmitted from the PC 15 via the packet communication apparatus 11 with the security agent function and the communication network 17 is received at the transmission channel control unit 32 and transmitted to the tag verification unit 35. The tag verification unit 35 determines whether a security tag is attached to the received packet. If a security tag is attached to the packet, the tag verification unit 35 transmits the packet to the tag processing unit 37. If a security tag is not attached to the packet, the tag verification unit 35 discards the received packet.

The tag processing unit 37 searches the policy record unit 38 using the information included in the security tag attached to the packet as a key. In the present example, a user attribute value and an application identifier are used as the key. The security policy of the policy record unit 38 may be stored in a format that enables mechanical determination of the conditions to be satisfied by the user attribute value for each application.

If the conditions are not satisfied, the tag processing unit 37 discards the packet. If the conditions are satisfied, the tag processing unit 37 removes the security tag from the packet and transmits the resulting packet to the server front processing unit 34.

Then, known processes such as load sharing by the server front processing unit 34 may be performed after which that packet is transmitted to the application server 16 via the transmission channel control unit 33.

In the packet communication apparatus 12 having the security judging function, a security policy may be set beforehand for each server by the security manager, only packets received from users providing security tag information that satisfies a corresponding security policy may be allowed to pass, and assurance may be provided that the security policy is not forged.

Further, in the packet communication apparatus 12 having the security judging function, a special terminal that is allowed to access a server without a security tag may be designated during transition from an existing environment in order to ensure that an existing server load sharing function will not be affected.

Thus, in an access control system according to an embodiment of the present invention including the packet communication apparatus 11 with the security agent function and the packet communication apparatus 12 with the security judging function, a security manager may have complete control over which user is to be allowed access to which server with which application.

Also, in an access control system according to an embodiment of the present invention, a user with malicious intentions may be prevented from illegally accessing the packet communication apparatuses 11 and 12 or tampering with their settings so that unauthorized access to the application server 16 may be prevented. It is noted that illegally accessing the packet communication apparatuses 11 and 12 and tampering with their settings are far more difficult to accomplish compared to illegally accessing a general purpose server implemented in a general purpose OS, for example.

Also, an access control system according to an embodiment of the present invention does not depend on the network so that it may not be affected by changes made in the network configuration. Further, application operations of an existing network function or server may be prevented from being influenced by access control system.

Embodiment 2

In Embodiment 1, the packet communication apparatus 11 with the security agent function is configured to attach a security tag to every packet. However, depending on the processing capacity of the packet communication apparatus 11, the communication performance may be affected in such a case. Accordingly, in Embodiment 2, a packet to which a security tag is to be attached is determined beforehand, and a security tag is attached only to such a packet. It is noted that the packet communication apparatus 11 according to the present embodiment has the same configuration as that shown in FIG. 7 and descriptions thereof are omitted.

The packet communication apparatus 11 checks whether a user providing a packet is authenticated and determines whether a security packet is to be attached to the packet. Upon determining that a security tag is to be attached to the packet, the packet communication apparatus 11 attaches a security tag to the packet.

For example, in TCP/IP communication, a session is established between the PC 15 and the application server 16 by a Syn packet. Accordingly, the packet communication apparatus 11 may be configured to attach a security tag only to a Syn packet to reduce its load.

Figure 9:
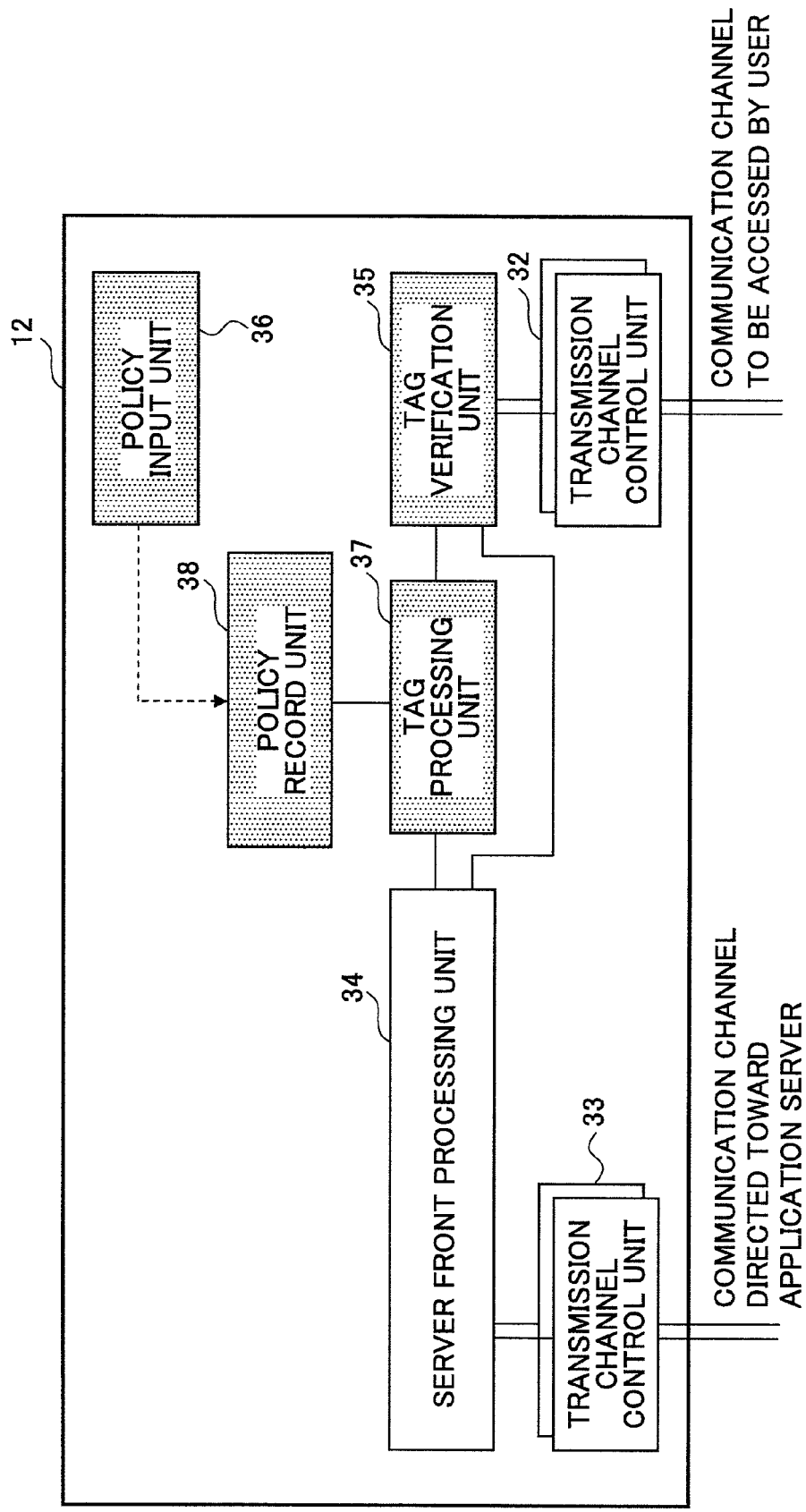
FIG. 9 is a block diagram showing another exemplary configuration of a packet communication apparatus having a security judging function.

FIG. 9 is a block diagram showing another exemplary configuration of a packet communication apparatus having a security judging function. The configuration of the packet communication apparatus 12 of FIG. 9 differs from that of FIG. 8 in that it includes a bypass route that connects the tag verification unit 35 and the server front processing unit 34.

In the following, operations of the security judging function of the packet communication apparatus 12 of FIG. 9 are described. In the example described below, it is assumed that presetting of a security policy in the policy record unit 38 by the policy input unit 36 is already completed.

A packet transmitted from the PC 15 via the packet communication apparatus 11 having the security agent function and the communication network 17 is received at the transmission channel control unit 32 and transmitted to the tag verification unit 35. The tag verification unit 35 determines whether the packet corresponds to a packet that should have a security tag attached thereto.

If the packet does not correspond to a packet that should have a security tag attached thereto, the tag verification unit 35 transmits the packet to the server front processing unit 34. On the other hand, if the packet corresponds to a packet that should have a security tag attached thereto, the tag verification unit 35 determines whether a security tag is attached to the packet. If a security tag is attached to the packet, the tag verification unit transmits the packet to the tag processing unit 37. If a security tag is not attached to the packet, the tag verification unit discards the packet. Then, processes identical to the operations of the security judging function of the packet communication apparatus 12 of FIG. 8 may be performed.

It is noted that in the present embodiment, a security tag including an application identifier and a user attribute value as is illustrated in FIG. 5 is used. However, the present invention is not limited to use of such a security tag and security tags having other configurations may be equally used.

Figure 10:
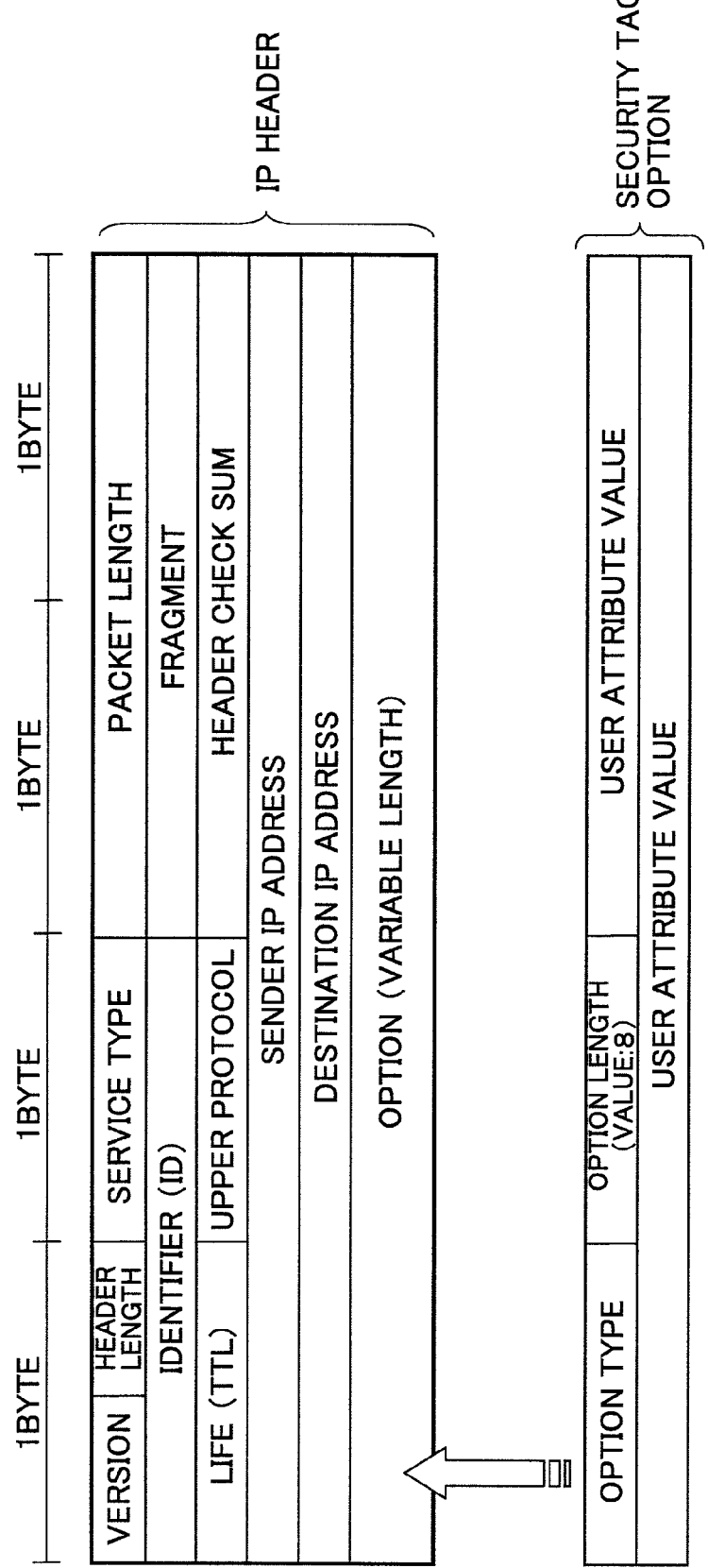
FIG. 10 is a diagram showing another exemplary format of a security tag.

FIG. 10 is a diagram showing another exemplary format of a security tag. The illustrated security tag of FIG. 10 includes a user attribute value and is set in an option field of an IP header.

It is noted that an application identifier does not necessarily have to be included in the security tag since the packet application may be determined by examining packet header information referred to as TCP port number, for example. In this case, the application identifier is determined at the packet communication apparatus 12 having the security judging function.

In an access control system where both the security tags of FIGS. 5 and 10 are used, the packet communication apparatus 12 with the security judging function determines whether an application identifier is included in a security tag. If an application identifier is not included in the security tag, the packet communication apparatus 12 may determine the application identifier by examining the packet header information called TCP port number, for example.

In an access control system according to an embodiment of the present invention, the number of rules set in a packet communication apparatus may be reduced to m+n from m×n of the prior art, and procedures for realizing alteration/addition of the set rules in response to movement of a terminal or addition of a server may be simplified. Further, in an access control system according to an embodiment of the present invention, communication may be controlled according to detailed conditions such as the status of the terminal used by a user, and information on the packet application so that both security and convenience may be realized within a corporate network.

It is particularly noted that by using a user attribute value in an access control system according to an embodiment of the present invention, a person without network expertise may be able to set rules in a packet communication apparatus. For example, in the access control system according to the above embodiment, personal information of an employee does not have to be handed over to an infrastructure operating division; rather, a person at the human resources division may directly input such information as security policy information.

Also, an access control system according to an embodiment of the present invention does not depend on the network so that settings do not have to be adjusted in accordance with changes in the network configuration or movement of a user, for example. Further, an access control system according to an embodiment of the present invention does not depend on a protocol so that it may be suitably adapted for use in a non-IP-based network such as a ubiquitous network that is expected to become more widespread in the future.

Further, the present invention is not limited to these embodiments, and variations and modifications may be made without departing from the scope of the present invention.

What is claimed is:

1. An access control method for a network including a plurality of packet communication apparatuses, the method comprising:

an authentication server sending authentication result information and user attribute information to a sender packet communication apparatus;

said sender packet communication apparatus sending the authentication result information to a user terminal which a user uses and storing the user attribute information of said user and identification information of said user terminal by relating to each other;

said sender packet communication apparatus further receiving a packet sent from said user terminal, searching for the user attribute information of said user stored in said sender packet communication apparatus by using packet sender identification information contained in said received packet as a key, said sender packet communication apparatus further attaching the user attribute information to the packet transmitted by said user terminal; and a communication control mechanism, within an end system corresponding to a destination packet communication apparatus or a packet receiving apparatus, performing access control based on the user attribute information attached to the packet, wherein the user attribute information includes at least one of security information and access right information, the security information being previously set for each user and the access right information indicating a user access right previously set for each user.

2. The access control method as claimed in claim 1, wherein said communication control mechanism performing the access control based on policy information that is set beforehand and the user attribute information.

3. The access control method as claimed in claim 1, wherein said communication control mechanism further deleting the user attribute information attached to the packet.

4. The access control method as claimed in claim 1, wherein said sender packet communication apparatus further attaching application information of the packet along with the user attribute information to the packet transmitted by said user terminal; and said communication control mechanism performing access control based on a combination of the user attribute information attached to the packet and the application information of the packet.

5. The access control method as claimed in claim 1, wherein when user attribute information is attached to the packet to be transmitted beforehand, said sender packet communication apparatus deletes said user attribute information that is attached beforehand and attaches new user attribute information to the packet to be transmitted.

6. The access control method as claimed in claim 1, wherein said sender packet communication apparatus attaches the user attribute information when the packet to be transmitted is determined to be a packet to which user attribute information has to be attached; and said communication control mechanism performs the access control based on the user attribute information attached to the packet when the packet received is determined to be a packet to which user attribute information has to be attached.

7. An access control system including a plurality of packet communication apparatuses, the system comprising:
an authentication server;
a sender packet communication apparatus; and
a destination packet communication apparatus,
wherein said authentication server is connected to said sender packet communication apparatus and sends authentication result information and user attribute information to said sender packet communication apparatus,
said sender packet communication apparatus sends the authentication result information to a user terminal which a user uses, and stores the user attribute information of said user and identification information of said user terminal by relating to each other,
said sender packet communication apparatus receives a packet sent from said user terminal, searches for the user attribute information of said user stored therein by using packet sender identification information contained in said received packet as a key, and attaches the user attribute information to the packet transmitted by said user terminal, and
said destination packet communication apparatus performs access control based on the user attribute information attached to the packet,
wherein the user attribute information includes at least one of security information and access right information, the security information being previously set for each user and the access right information indicating a user access right previously set for each user.

8. A packet communication apparatus comprising:
an attribute information receiving unit that receives authentication result information of a user and user attribute information from an authentication server;
an attribute information storing unit that stores the user attribute information of said user and identification information of a user terminal of said user by relating to each other;
a packet receiving unit that receives a packet;
an attribute information searching unit that searches for the user attribute information stored in said attribute information storing unit by using packet sender identification information contained in a packet received by said packet receiving unit as a key;
an attribute information attaching unit that attaches the user attribute information to the packet; and
an access control unit that performs access control based on user attribute information attached to the packet,
wherein the user attribute information includes at least one of security information and access right information, the security information being previously set for each user and the access right information indicating a user access right previously set for each user.

9. An access control system including a plurality of packet communication apparatuses, the system comprising:
an authentication server;
a sender packet communication apparatus; and
a communication control mechanism within a destination end system,
wherein said authentication server is connected to said sender packet communication apparatus and sends authentication result information and user attribute information to said sender packet communication apparatus,
said sender packet communication apparatus sends the authentication result information to a user terminal which a user uses, and said sender packet communication apparatus stores the user attribute information of said user and identification information of said user terminal by relating to each other,
said sender packet communication apparatus receives a packet sent from said user terminal, searches for the attribute information of said user stored therein by using packet sender identification information contained in said received packet as a key, and attaches the user attribute information to the packet transmitted by said user terminal, and
said destination packet communication apparatus within said destination end system performs access control based on the user attribute information attached to said packet,
wherein the user attribute information includes at least one of security information and access right information, the security information being previously set for each user and the access right information indicating a user access right previously set for each user.

10. An end system comprising:
an attribute information receiving unit that receives authentication result information of a user and user attribute information from an authentication server;
an attribute information storing unit that stores the user attribute information of said user and identification information of a user terminal of said user by relating to each other;
a packet receiving unit that receives a packet;
an attribute information searching unit that searches for the user attribute information stored in said attribute information storing unit by using packet sender identification information contained in a packet received by said packet receiving unit as a key;
an attribute information attaching unit that attaches the user attribute information to said packet; and
a communication control mechanism including an access control unit that performs access control based on user attribute information attached to a packet addressed to the end system,
wherein the user attribute information includes at least one of security information and access right information, the security information being previously set for each user and the access right information indicating a user access right previously set for each user.

* * * * *